United States Patent
Kaminski et al.

(10) Patent No.: US 6,866,304 B2
(45) Date of Patent: Mar. 15, 2005

(54) RECEIVING PART OF A FLUID PLUG-IN COUPLING

(75) Inventors: Volker Kaminski, Halver (DE); Jannis Serdaris, Gummersbach (DE); Norbert Terlau, Kürten (DE); Frank Zenses, Hürth (DE)

(73) Assignee: Voss Automotive GmbH, Wipperfurth (DE)

(*) Notice: Subject to any disclaimer, the term of this patent is extended or adjusted under 35 U.S.C. 154(b) by 89 days.

(21) Appl. No.: 10/355,363

(22) Filed: Jan. 31, 2003

(65) Prior Publication Data

US 2003/0168856 A1 Sep. 11, 2003

(30) Foreign Application Priority Data

Feb. 2, 2002 (DE) .................................. 202 01 574 U

(51) Int. Cl.[7] .............................................. F16L 37/00
(52) U.S. Cl. ....................................... 285/319; 285/317
(58) Field of Search ........................... 285/319, 317, 285/318, 321, 315, 308, 316

(56) References Cited

U.S. PATENT DOCUMENTS

| 4,691,943 A | 9/1987 | DeLand et al. |
| 4,846,506 A | 7/1989 | Bocson et al. |
| 4,944,536 A | 7/1990 | Bartholomew |
| 4,979,765 A | 12/1990 | Bartholomew |
| 5,002,315 A * | 3/1991 | Bartholomew ............... 285/319 |
| 5,056,756 A | 10/1991 | Norkey et al. |
| 5,100,182 A * | 3/1992 | Norkey et al. ............... 285/319 |
| 5,161,833 A * | 11/1992 | McNaughton et al. ...... 285/319 |
| 5,161,834 A | 11/1992 | Norkey |
| 5,219,188 A * | 6/1993 | Abe et al. .................... 285/319 |
| 5,472,016 A | 12/1995 | Szabo |
| 5,542,716 A * | 8/1996 | Szabo et al. ................. 285/319 |
| 5,542,717 A | 8/1996 | Rea et al. |
| 5,890,749 A * | 4/1999 | Fukaya et al. ............... 285/319 |
| 5,895,078 A * | 4/1999 | Le Clinche ................. 285/308 |
| 6,250,692 B1 * | 6/2001 | Ito et al. ...................... 285/319 |
| 6,464,264 B1 * | 10/2002 | Ito et al. ...................... 285/319 |
| 6,540,264 B1 * | 4/2003 | Yokoyama et al. ......... 285/319 |
| 6,634,679 B1 * | 10/2003 | Stieler .......................... 285/319 |

FOREIGN PATENT DOCUMENTS

| EP | 0485214 B1 | 1/1996 | |
| GB | 2 178 501 | 2/1987 | |
| JP | 6185683 | * 8/1994 | ................. 285/319 |
| JP | 6221485 | * 9/1994 | ................. 285/319 |

* cited by examiner

Primary Examiner—David Bochna
(74) Attorney, Agent, or Firm—Brinks Hofer Gilson & Lione

(57) ABSTRACT

A receiving part of a fluid plug-in coupling is provided. The receiving part comprises a socket housing having a plug-in opening for a plug part and a sealing arrangement, which is arranged in the socket housing, for the plugged-in plug part. In this case, the sealing arrangement is fixed axially in the removal direction of the plug part by a closing bushing, and the closing bushing is secured directly in the socket housing via a locking portion.

7 Claims, 2 Drawing Sheets

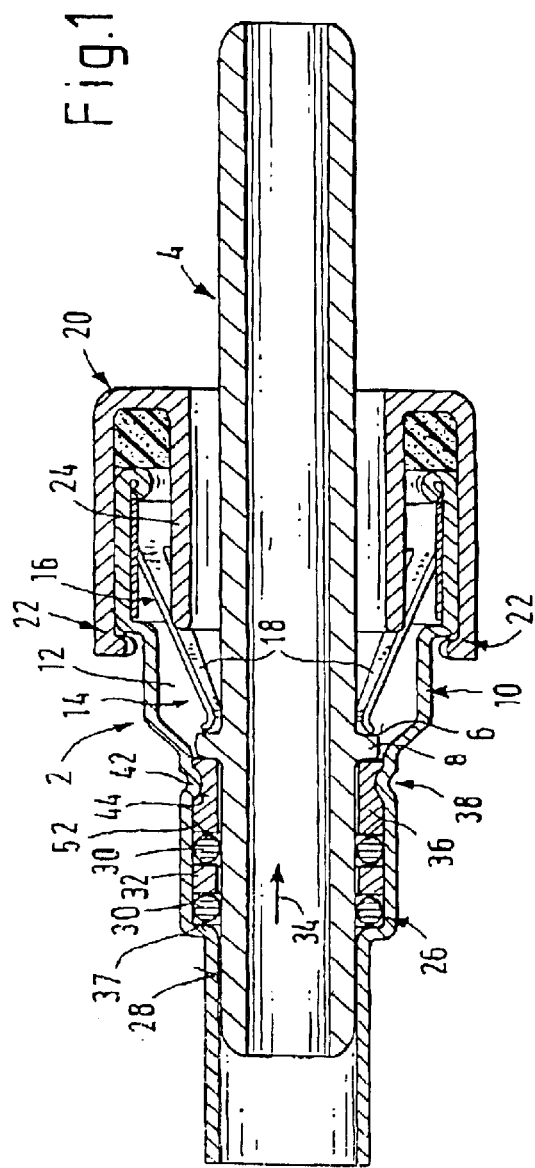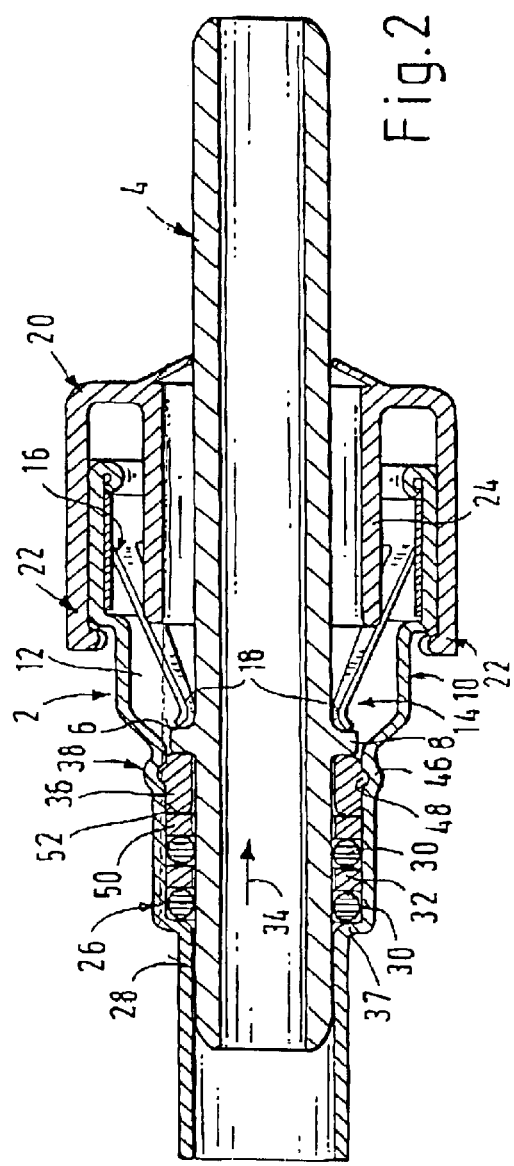

RECEIVING PART OF A FLUID PLUG-IN COUPLING

BACKGROUND OF THE INVENTION

The present invention relates to a receiving part of a fluid plug-in coupling (the term fluid refers to any hydraulic or gaseous flow media) comprising a socket housing and a sealing arrangement. The socket housing having a plug-in opening for a plug part. The sealing arrangement being arranged in the socket housing and adapted to interface with the plug part. The sealing arrangement being fixed axially in the removal direction of the plug part by means of a closing bushing.

EP 0 485 214 B1 describes a receiving part of this type in which the closing bushing is arranged in the socket housing by resting axially on a retaining element. The retaining element, as a stamped and bent sheet-metal part, is mounted in the widened region of the socket housing and, for the locking of a plugged-in plug part, has radially spring elastic latching arms which engage in a latching manner behind a radial retaining step of the plug part. On its end region facing the closing bushing, the retaining element has a radially inwardly angled web for resting, in a manner fixing it in place, on the closing bushing. In this design, the sealing arrangement, which comprises a spacer bushing situated between two O-rings, is only fixed in the socket housing via the closing bushing when the retaining element is inserted. In addition, due to unavoidable production tolerances, particularly in the case of the sheet metal retaining element, a undesirable axial play may occur in the region of the sealing arrangement.

The documents U.S. Pat. No. 4,979,765, U.S. Pat. No. 4,944,536, U.S. Pat. No. 4,846,506 and U.S. Pat. No. 4,691,943 also disclose a very similar or in part virtually identical prior art, as the closing bushing designed as a shaped sheet metal part according to the previously described reference.

SUMMARY OF THE INVENTION

The present invention is based on the object of improving a receiving part a fluid plug-in coupling in the region of the sealing arrangement in such a manner that a simple production, installation sequence, and optimal sealing properties are ensured.

According to the invention, this is achieved by the closing bushing being secured directly in the socket housing by a locking means. The locking means directly locks the closing bushing in the socket housing independent of additional individual parts. The entire sealing arrangement is already securely fixed even before other individual parts, such as a plug-retaining element, are fitted. This facilitates the installation by preventing slipping of the sealing arrangement, or even complete slipping of parts out of the sealing arrangement. In addition, the fastening of the closing bushing can take place at a precise location in such a manner that optimal sealing properties are ensured in the region of the sealing arrangement virtually irrespective of production to tolerances.

According to the invention, the closing bushing can be fastened nonreleasably in the socket housing, for example by a plastic deformation of the socket housing that is directed radially inwards toward the closing bushing. Providing the socket housing as locking means is particularly advantageous for simple installation of the closing bushing. By this means, the closing bushing needs merely to be inserted axially into the socket housing, and the locking takes place automatically by means of the latching.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 shows an axial section of a plug-in coupling in a first embodiment of the receiving part with a plugged-in plug part, FIG. 2 shows an illustration similar to FIG. 1 in a second embodiment of the receiving part.

DETAILED DESCRIPTION OF THE INVENTION

Figure 3:
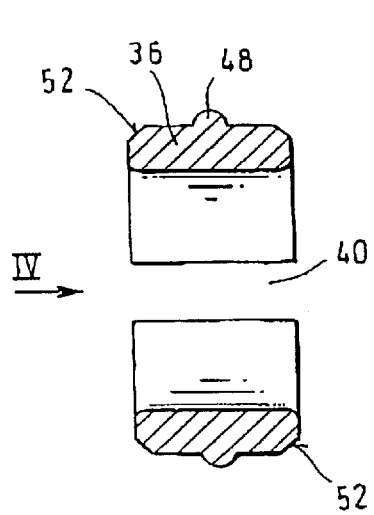
FIG. 3 shows a separate, enlarged sectional view (III—III according to FIG. 4) of an individual part, i.e. of a sealing closing bushing.

In the various figures of the drawings, identical parts are always provided with the same reference numbers.

As emerges initially from FIGS. 1 and 2, in each case a plug-in coupling comprises a receiving part 2 and a plug part 4. However, the invention relates only to the receiving part 2 while the plug part 4 has a standard design ("SAE plug") in the form of a section of pipe which has an annular projection 8 so as to form a radial retaining step 6 on its outer circumference.

The receiving part 2 comprises a socket housing 10 having a plug-in opening 12 for the plug part 4 and having a retaining device 14 for releasably fixing the plugged-in plug part 4 in place. For this purpose, the retaining device 14 has a retaining element 16 which is mounted in the socket housing 10. This retaining element 16 having radially elastically deformable retaining sections 18 for latching engagement behind the retaining step 6 of the plug part 4.

The receiving part 2 furthermore has a release element 20 which is secured on the outside of the socket housing 10 in an axially displaceable manner relative to the socket housing 10 via latching means 22. In this case, the release element 20 engages by means of an inner, hollow cylindrical (sleeve-shaped) release section 24 in the plug-in opening 12 and, for the purpose of releasing the locked plug part 4, acts here against the retaining sections 18 of the retaining element 16.

Furthermore according to FIGS. 1 and 2, a sealing arrangement 26 for circumferentially sealing the plugged-in plug part 4 on the outer circumference 28, is arranged within the socket housing 10. In the designs illustrated, the sealing arrangement 26 comprises two sealing rings 30 (in particular o-rings) and a spacer ring 32 arranged between them.

This sealing arrangement 26 is retained in the socket housing 10 axially in a plug removal direction (arrow 34) by means of a closing bushing 36, and being supported opposite in the plug-in direction on a radial step 37 in the socket housing 16. In this case, provision is made according to the invention for the closing bushing 36 to be retained in an axially fixed manner directly in the socket housing 10 by locking means 38. A latching of the closing bushing 36 in the socket housing 10 is preferably provided as locking means 38. For this purpose, the closing bushing 36 (also compare FIGS. 3 and 4 in this respect) is designed in a manner such that it can be deformed radially and elastically by means of a continuous slot-type interruption 40 with corresponding radial latching means being provided in the outer circumference of the closing bushing 36, and in the inner circumference of the socket housing 10. For this purpose and in the design according to FIG. 1, provision is made for the latching means to comprise a radially inwardly projecting bead-like annular bump 42 on the socket housing 10 and a radial annular depression 44 on the closing bushing 36. In the case of this design, the radially inwardly projecting annular bump 42 means that the spacer ring 32 also has to be designed in a manner that it can be deformed radially and elastically for insertion through a slot-type interruption.

In the case of the design which is to be preferred in this respect according to FIG. 2, provision is made for the locking means 38 to comprise a radially outwardly directed annular depression 46 in the socket housing 10 and a radial, bead-like annular bump 48 on the closing bushing 36. In the case of this design, it is advantageous that within the socket housing 10 a free cross section is produced for insertion of the components of the sealing arrangement 26, and the spacer ring 32, which can thereby be designed such that it is not slotted. This provides a continuous bearing surface for each sealing ring 30. In this case, it is additionally advantageous if an additional supporting ring 50 is arranged between the closing bushing 36 and the nearest sealing ring 30, it being possible for the supporting ring to be designed such that it is likewise unslotted and is circumferentially continuous. By this means, the sealing ring 30 is also protected on this side against being pressed axially into the slot-type interruption 40 of the closing bushing 36.

In order to facilitate the insertion of the closing bushing 36 into the socket housing 10, the closing bushing 36 has, at least on one side a bevel as introductory slope 52 (see FIGS. 3 and 4), which automatically brings about the elastic radial deformation which is required for latching purposes.

Figure 4:
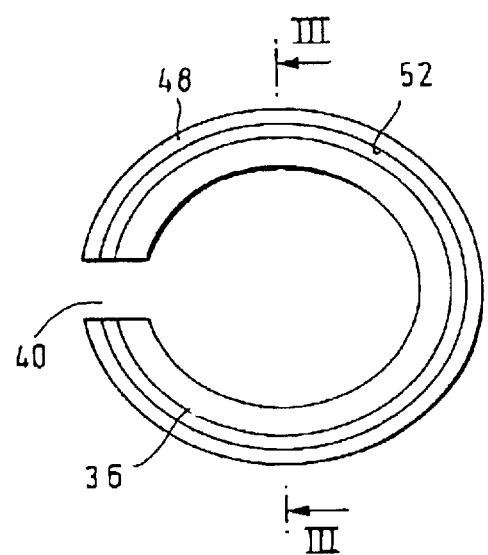
FIG. 4 shows an axial end view in the arrow direction IV according to FIG. 3.

In contrast to the designs according to FIGS. 1 and 2, according to FIGS. 3 and 4, provision can be made for the closing bushing 36 to be of symmetrical design in the axial direction with regard to the position, in particular of its annular bump 48 (or alternatively its annular depression 44 according to FIG. 1). This facilitates the installation, since attention does not need to be focused on the orientation during insertion. There is, of course, a bevel or introductory slope 52 on both sides.

As an alternative to the illustrated designs having latching, a direct, nonreleasable securing of the closing bushing 36 in the socket housing 10 may also be provided according to the invention. For this purpose, the closing bushing 36, preferably provided with the annular depression 44 corresponding to FIG. 1, is then designed such that it is unslotted and rigid radially and dimensionally stable. The securing then takes place, after the insertion, by means of a radial, plastic deformation of the socket housing 10, which is originally cylindrical in this region.

By means of its means of fixing it in place according to the invention, the closing bushing 36 advantageously also forms an axial stop (plug-in boundary) for the plug part 4 and its annular projection. The annular projection 8 can be retained in an essentially play-free manner between the closing bushing 36 and the retaining sections 18 of the retaining element 16.

Further details of the receiving part 2 are also described in an application of the applicant entitled RECEIVING PART OF A FLUID PLUG-IN COUPLING, filed on Jan. 31, 2003, and is having the serial number 10/355,362, published as 2003/0168855, now abandoned, which fully incorporated by reference herein.

While the above description constitutes the preferred embodiment of the present invention, it will be appreciated that the invention is susceptible to modification, variation and change without departing from the proper scope and fair meaning of the accompanying claims.

What is claimed is:

1. A receiving part of a fluid plug-in coupling, comprising:
   a socket housing having a plug-in opening for a plug part;
   a sealing arrangement, which is arranged in the plug-in opening of the socket housing;
   a closing bushing fixing the sealing arrangement axially in the removal direction of the plug part wherein the dosing bushing is secured directly in the socket housing by a latching of the closing bushing in the socket housing, wherein the closing bushing can be deformed radially and elastically by means of a continuous slot-type interruption with a corresponding radial latching means being formed on an outer circumference of the closing bushing and in an inner circumference of the socket housing; and
   an unslotted circumferentially continuous supporting ring arranged between the closing bushing and a sealing ring.

2. The receiving part as claimed in claim 1, wherein the latching means comprises a radially inwardly projecting annular bump on the socket housing and a radial annular depression on the closing bushing.

3. The receiving part as claimed in claim 1, wherein the latching means comprises a radially outwardly directed annular depression in the socket housing and a radial annular bump on the closing bushing.

4. The receiving part as claimed in claim 1, wherein the sealing arrangement has two sealing rings which are spaced apart by a spacer ring.

5. The receiving part as claimed in claim 1, wherein the sealing arrangement is supported on a radial step in the socket housing, the sealing arrangement lying axially opposite the closing bushing.

6. The receiving part as claimed in claim 1, wherein the socket housing is formed a single part from a formed section of pipe or from a deep-drawn metal blank.

7. The receiving part as claimed in claim 1, wherein the socket housing is formed as a single part from a deep drawn metal blank.

* * * * *

UNITED STATES PATENT AND TRADEMARK OFFICE
CERTIFICATE OF CORRECTION

PATENT NO. : 6,866,304 B2
DATED : March 15, 2005
INVENTOR(S) : Volker Kaminski et al.

It is certified that error appears in the above-identified patent and that said Letters Patent is hereby corrected as shown below:

Title page,
Item [30], Foreign Application Priority Data, delete "202 01 574 U" and substitute -- 202 01 574.2 -- in its place.

Column 4,
Line 25, before "bushing" delete "dosing" and substitute -- closing -- in its place.

Signed and Sealed this

Fifteenth Day of November, 2005

JON W. DUDAS
*Director of the United States Patent and Trademark Office*